United States Patent [19]

Okada et al.

[11] Patent Number: 4,628,637

[45] Date of Patent: Dec. 16, 1986

[54] CONSTRUCTION OF DOOR IN MOTOR VEHICLE

[75] Inventors: Hachiro Okada; Kenzi Ono, both of Toyota, Japan

[73] Assignee: Toyota Jidosha Kabushiki Kaisha, Japan

[21] Appl. No.: 813,871

[22] Filed: Dec. 27, 1985

[30] Foreign Application Priority Data

Jan. 9, 1985 [JP] Japan ............................. 60-1057[U]

[51] Int. Cl.$^4$ ............................................. E05F 11/38
[52] U.S. Cl. ......................................... 49/374; 49/440
[58] Field of Search ................. 49/374, 375, 440, 441, 49/227

[56] References Cited

U.S. PATENT DOCUMENTS

| | | |
|---|---|---|
| 4,240,227 | 12/1980 | Hasler et al. |
| 4,409,756 | 10/1983 | Audenino et al. ..................... 49/440 |
| 4,417,419 | 11/1983 | Rossie et al. ...................... 49/374 X |
| 4,503,639 | 3/1985 | Rossie et al. ........................... 49/374 |
| 4,571,886 | 2/1983 | Shiraishi ................................ 49/374 |

FOREIGN PATENT DOCUMENTS 2,133,448 7/1984 United Kingdom .

*Primary Examiner*—Kenneth Downey
*Attorney, Agent, or Firm*—Parkhurst & Oliff

[57] ABSTRACT

A construction of a door in a motor vehicle, comprising: a guide piece secured to an end edge of a door glass and protruded into a compartment; a guide member disposed adjacent the end edge of the door glass on the side of the compartment, for slidably guiding the guide piece in the direction of opening or closing of the door glass; and a door glass weather strip having an inner seal lip secured to a door window frame adjacent the end edge of the door glass and being in contact with the side surface of the end edge of the door glass on the side of the compartment to seal between the end edge and the door window frame; wherein a support portion extended to the side surface of the inner seal lip on the side of the compartment, for contacting the inner seal lip from the side of the compartment to support same is integrally formed on the guide member.

20 Claims, 2 Drawing Figures

CONSTRUCTION OF DOOR IN MOTOR VEHICLE

BACKGROUND OF THE INVENTION

1. Field of the Invention

This invention relates to a construction of a door in a motor vehicle, and more particularly to improvements in a construction of a door in a motor vehicle, wherein the construction comprises:

a guide piece secured to an end edge of a door glass and protruded into a compartment;

a guide member disposed adjacent the end edge of the door glass on the side of the compartment, for slidably guiding the guide piece in the direction of opening or closing of the door glass; and a door glass weather strip having an inner seal lip secured to a door window frame adjacent the end edge of the door glass and being in contact with the side surface of the end edge of the door glass on the side of the compartment to seal between the end edge and the door window frame.

2. Description of the Prior Art

To decrease air resistance and wind noises during high speed running of the motor vehicle, there has been proposed a so-called flush surface type motor vehicle, wherein the outer surface of a vehicle body, including the outer surfaces of the door glasses are made flush with one another.

On the other hand, the door glass of the motor vehicle is subjected to a force of sucking the door glass outwardly due to a difference in pressure between the interior and the exterior of a compartment during running of the motor vehicle at high speed, so that it becomes necessary to provide door glass holding means.

As this means, there has heretofore been adopted such an arrangement that the door glass is held in the thicknesswise direction thereof by a glass run provided on a door window frame. However, a difference in stage occurs between the door window frame and the outer surface of the door glass, thus causing the increase of air resistance and the generation of the wind noises during high speed running of the motor vehicle.

As against this, as disclosed in West German Patent No. 2809721, Japanese Patent Kokai (Laid-Open) No. 5217/1981 or the like for example, there has been proposed a construction of a door in a motor vehicle, comprising:

a guide piece secured to an end edge of a door glass and protruded into a compartment;

a guide member disposed adjacent the end edge of the door glass and on the side of the compartment, for slidably guiding the guide piece in the direction of opening or closing of the door glass; and a door glass weather strip having an inner seal lip secured to a door window frame adjacent the end edge of the door glass and being in contact with the side surface of the end edge of the door glass on the side of the compartment to seal between the end edge and the door window frame.

Here, the door glass weather strip is brought into sliding contact with the inner surface or the end edge of the door glass to seal between the interior and the exterior of the door glass. However, in the former case of West German Patent No. 2809721, the door glass weather strip is small in sectional area and the scope of the door glass weather strip being in contact with the end edge of the door glass is limited, thus presenting such a disadvantage that the seal failures tend to occur when the assembling accuracy is low.

Furthermore, in the latter case of Japanese Patent Kokai (Laid-Open) No. 5217/1981, in order to perform a satisfactory sealing function of the inner seal lip being in contact with the inner surface of the end edge of the door glass, the inner seal lip is formed into a bag shape and formed long along the inner surface of the door glass, whereby a distance from the end edge of the inner periphery of the door window frame to the guide member becomes large. Because of this, the door window frame including the guide member becomes thick in width, thus presenting such disadvantages that the scope of sight in the door glass obstructed by these facts is expanded and the appearance of the vehicle is lowered.

SUMMARY OF THE INVENTION

It is therefore the primary object of the present invention to provide a construction of a door in a motor vehicle, wherein, even if the dimensional accuracy and the assembling accuracy are relatively low, the sealing function by the door glass weather strip can be satisfactorily maintained, the scope of sight in the door glass obstructed by the door window frame including the guide member is decreased, and the appearance of the vehicle can be improved.

To this end, the present invention contemplates that, in a construction of a door in a motor vehicle, wherein the construction comprises a guide piece secured to an end edge of a door glass and protruded into a compartment, a guide member disposed adjacent the end edge of the door glass on the side of the compartment, for slidably guiding the guide piece in the direction of opening or closing of the door glass, and a door glass weather strip having an inner seal lip secured to a door window frame adjacent the end edge of the door glass and being in contact with the side surface of the end edge of the door glass on the side of the compartment to seal between the end edge and the door window frame, a support portion extended to the side surface of the inner seal lip on the side of the compartment, for contacting the inner seal lip from the side of the compartment to support the same is integrally formed on the guide member.

To the above end, the present invention contemplates that the inner seal lip is extended from a main body of the door glass weather strip and the forward end thereof is formed into a contilever-shaped member being in contact with the end edge of the door glass.

To the above end, the present invention contemplates that the inner seal lip is folded in two in the intermediate portion thereof and a proximal half portion thereof on the side of the compartment is in contact with the support portion to be supported.

To the above end, the present invention contemplates that said inner seal lip is folded in two in the intermediate portion thereof and a distal half portion folded in two of the inner seal lip is turned back to the side opposite to the guide piece and brought in contact at the outer surface thereof with the inner surface of the end edge of the door glass.

To the above end, the present invention contemplates that a distal half portion folded in two of the inner seal lip is turned back to the side opposite to the guide piece and brought in contact at the outer surface thereof with the inner surface of the end edge of the door glass.

To the above end, the present invention contemplates that the support portion is formed into a curved flange-shaped member starting from an end portion of the guide member on the side of the inner seal lip, forming a surface in contact with the inner seal lip, extending along the side surface of the inner seal lip on the side of the compartment and ending at the main body of the door glass weather strip.

To the above end, the present invention contemplates that the guide member is an extruded metallic member fixed to a stepped portion of the door window frame facing inside the guide piece and provided with a guide groove being of a U-shape in cross section.

The inner seal lip according to the present invention is in contact with the support portion integrally formed on the guide member on the side of the compartment to be supported, so that the inner seal lip can perform a satisfactory sealing function without forming the inner seal lip into a bag shape or lengthening the same.

In consequence, the projection value of the inner seal lip from the door glass weather strip is decreased and the distance from the end edge of the inner periphery of the door window frame to the guide member is decreased, so that the scope of sight of the door glass can be expanded and the appearance of the vehicle can be improved.

DETAILED DESCRIPTION OF THE PREFERRED EMBODIMENT

Figure 1:
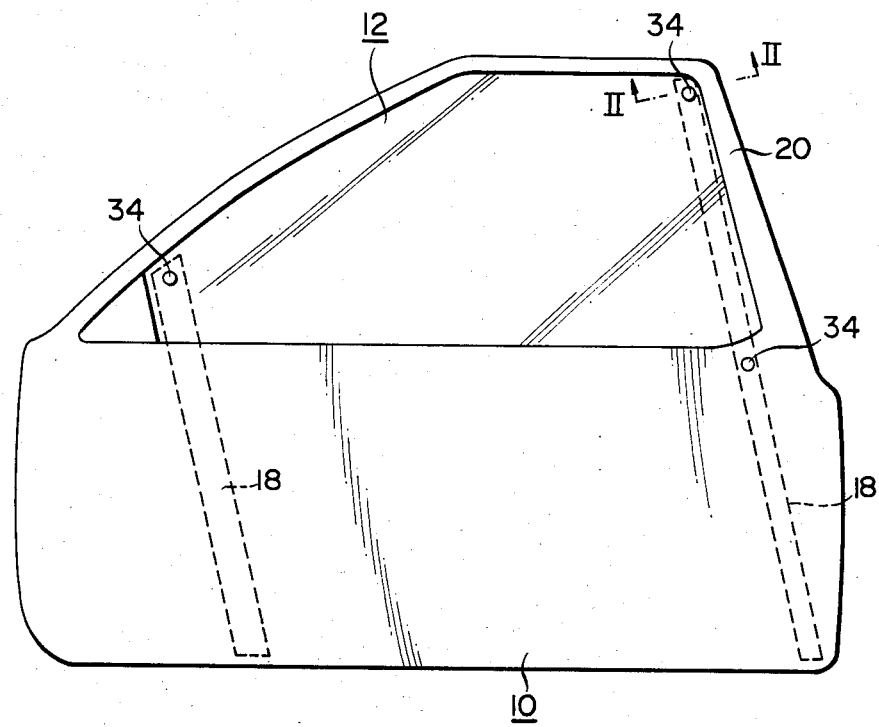
FIG. 1 is a front view showing the side door embodying the door construction in a motor vehicle according to the present invention.

Description will hereunder be given of one embodiment of the present invention with reference to the drawings.

According to this embodiment, in a construction of a door in a motor vehicle, wherein the construction comprises a guide piece 16 secured to an end edge 12A of a door glass 12 of a side door 10 in the motor vehicle, and protruded into a compartment 14, a guide member 18 disposed adjacent the end edge 12A of the door glass 12 on the side of the compartment 14, for slidably guiding the guide piece 16 in the direction of opening or closing of the door glass 12, and a door glass weather strip 22 having an inner seal lip 24 secured to a door window frame 20 adjacent the end edge 12A of the door glass 12 and being in contact with the side surface of the end edge 12A of the door glass 12 on the side of the compartment 14 to seal between the end edge 12A and the door window frame 20, a support portion 26 extended to the side surface of the inner seal lip 24 on the side of the compartment 14, for contacting the inner seal lip 24 from the side of the compartment 14 to support the same is integrally formed on the guide member 18.

Here, three of the guide pieces 16 are secured to the top end, the bottom end of the rear end edge 12A and the top end of the front end edge 12A of the door glass 12.

Figure 2:
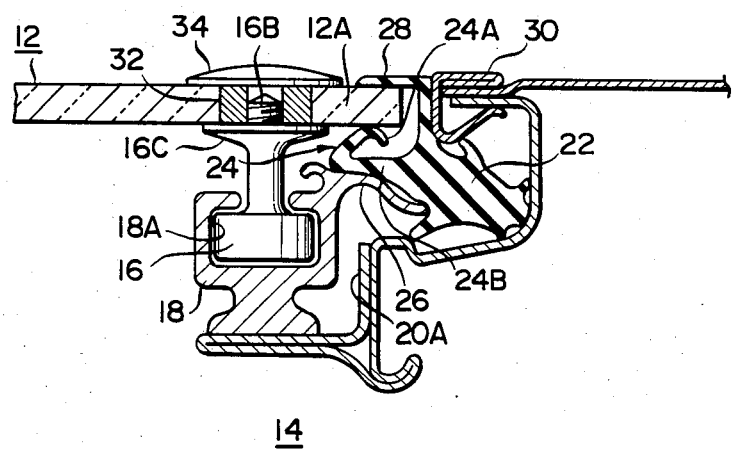
FIG. 2 is an enlarged sectional view taken along the line II—II in FIG. 1, showing one embodiment of the door construction in a motor vehicle according to the present invention.

In FIG. 2, designated at 28 is an outer seal lip extended from the main body of the door glass weather strip 22 to the outside, for sealing the outer surface of the end edge 12A of the door glass 12 and 30 a door window molding secured to the end edge of the inner periphery of the door window frame 20, for backing up the outer seal lip 28.

Here, the guide piece 16 is constituted by a disc-shaped sliding portion 16A and a tightening portion 16C formed at the forward end thereof with external threads 16B. The external threads 16B are threadably coupled into a nut 34 inserted into a through-hole 32 of the door glass 12 from outside, whereby the guide piece 16 is tightened and fixed to the door glass 12.

Furthermore, the guide member 18 is an extruded metallic member facing a stepped portion 20A inside the door window frame 20 and provided with a guide groove 18A being of a U-shape in cross section.

The inner seal lip 24 is extended from the main body of the door glass weather strip 22, the forward end 24A thereof is formed into the cantilever-shaped member being in contact with the end edge 12A of the door glass 12, the intermediate portion thereof is folded into two, and the proximal half portion 24B thereof on the side of the compartment 14 in contact with the support portion 26 to be supported.

The support portion 26 is formed into the curved flange-shaped member starting from the end portion of the guide member 18 on the side of the inner seal lip 24, forming a surface in contact with the inner seal lip 24, extending along the side surface of the inner seal lip 24 on the side of the compartment 14 and ending at the main body of the door glass weather strip 22.

The distal half portion 24A folded in two of the inner seal lip 24 is turned back to the side opposite to the guide piece 16 and brought in contact at the outer surface thereof with the inner surface of the end edge 12A of the door glass 12.

In consequence, in this embodiment, although the projection value of the inner seal lip 24 toward the guide piece 16 is small, the inner seal lip 24 is supported by the support portion 26 from the side of the compartment 14 so as to increase the contact pressure to the inner surface of the end edge 12A, so that the satisfactory sealing function can be maintained.

Because of this, as compared with the conventional case, the guide member 18 and the guide piece 16 can be positioned close to the door glass weather strip 22, whereby the distance between the guide member 18 and the end edge of the inner periphery of the door window frame 20 is decreased, so that the width of the door window frame 20 including the guide member 18 can be decreased.

In consequence, the scope of sight in the door glass 12 obstructed by the member 18 and the door window frame 20 can be reduced.

Furthermore, the inner seal lip 24 is formed into the cantilever shape, so that the door glass weather strip 22 can be rendered compact in size.

Further, the inner seal lip 24 is folded in two, the proximal half portion 24B thereof on the side of the compartment is supported by the support portion 26, and the inner seal lip 24 is in contact at the distal half portion 24A thereof with the surface of the end edge 12A of the door glass 12 on the side of the compartment, whereby the contact pressure of the distal half portion 24A to the end edge 12A is increased, so that the sealing function can be enhanced.

Further, in the above embodiment, the support portion 26 is formed into the curved flange-shaped member extending along the proximal half portion 24B of the inner seal lip 24 and reaching the main body of the door glass weather strip 22, so that the above embodiment is advantageous in that the function of holding the main body of the door glass weather strip 22 in the state of being pushed in the door window frame 20 can be achieved.

In consequence, when the door glass weather strip 22 is mounted, if the guide member 18 is not mounted, taken the operation of mounting the door glass weather strip 22 to the door window frame 20 can be easily carried out. Namely, the door glass weather strip 22 is provisionally fastened to the door window frame 20, and thereafter, the guide member 18 is mounted, whereby the door glass weather strip 22 can be finally fixed by the support portion 26 of the guide member 18.

Furthermore, even when the door glass weather strip 22 is mounted after the guide member 18 is mounted, the support portion 26 of the guide member 18 is formed into the flange-shaped member extended along the side surface of the proximal half portion 24B of the inner seal lip 24 on the side of the compartment 14 as described above, whereby the door glass weather strip 22 is pushed in along the support portion 26 to make the support portion 26 perform the guiding function, so that the operation of mounting the door glass weather strip 22 can be easily carried out.

What is claimed is:

1. A construction of a door in a motor vehicle, comprising:
    a guide piece secured to an end edge of a door glass and protruded into a compartment;
    a guide member disposed adjacent said end edge of the door glass on the side of the compartment, for slidably guiding said guide piece in the direction of opening or closing of the door glass; and
    a door glass weather strip having an inner seal lip secured to a door window frame adjacent said end edge of the door glass and being in contact with the side surface of said end edge of the door glass on the side of the compartment to seal between said end edge and the door window frame; wherein
    a support portion extended to the side surface of said inner seal lip on the side of the compartment, for contacting said inner seal lip from the side of the compartment to support same is integrally formed on said guide member.

2. A construction of a door in a motor vehicle as set forth in claim 1, wherein said inner seal lip is extended from a main body of said door glass weather strip and the forward end thereof is formed into a cantilever-shaped member being in contact with said end edge of the door glass.

3. A construction of a door in a motor vehicle as set forth in claim 2, wherein said inner seal lip is folded in two in the intermediate portion thereof and a proximal half portion thereof on the side of the compartment is in contact with said support portion to be supported.

4. A construction of a door in a motor vehicle as set forth in claim 2, wherein said inner seal lip is folded in two in the intermediate portion thereof and a distal half portion folded in two of the inner seal lip is turned back to the side opposite to the guide piece and brought in contact at the outer surface thereof with the inner sruface of the end edge of the door glass.

5. A construction of a door in a motor vehicle as set forth in claim 3, wherein a distal half portion folded in two of the inner seal lip is turned back to the side opposite to the guide piece and brought in contact at the outer surface thereof with the inner sruface of the end edge of the door glass.

6. A construction of a door in a motor vehicle as set forth in claim 1, wherein said support portion is formed into a curved flange-shaped member starting from an end portion of said guide member on the side of said inner seal lip, forming a surface in contact with said inner seal lip, extending along the side surface of said inner seal lip on the side of the compartemnt and ending at the body of the door glass weather strip.

7. A construction of a door in a motor vehicle as set forth in claim 2, wherein said support portion is formed into a curved flange-shaped member starting from an end portion of said guide member on the side of said inner seal lip, forming a surface in contact with said inner seal lip, extending along the side surface of said inner seal lip on the side of the compartemnt and ending at the body of the door glass weather strip.

8. A construction of a door in a motor vehicle as set forth in claim 3, wherein said support portion is formed into a curved flange-shaped member starting from an end portion of said guide member on the side of said inner seal lip, forming a surface in contact with said inner seal lip, extending along the side surface of said inner seal lip on the side of the compartemnt and ending at the body of the door glass weather strip.

9. A construction of a door in a motor vehicle as set forth in claim 4, wherein said support portion is formed into a curved flange-shaped member starting from an end portion of said guide member on the side of said inner seal lip, forming a surface in contact with said inner seal lip, extending along the side surface of said inner seal lip on the side of the compartemnt and ending at the body of the door glass weather strip.

10. A construction of a door in a motor vehicle as set forth in claim 5, wherein said support portion is formed into a curved flange-shaped member starting from an end portion of said guide member on the side of said inner seal lip, forming a surface in contact with said inner seal lip, extending along the side surface of said inner seal lip on the side of the compartemnt and ending at the body of the door glass weather strip.

11. A construction of a door in a motor vehicle as set forth in claim 1, wherein the guide member is an extruded metallic member fixed to a stepped portion of the door window frame facing inside the guide piece and provided with a guide groove being of a U-shape in cross section.

12. A construction of a door in a motor vehicle as set forth in claim 2, wherein the guide member is an extruded metallic member fixed to a stepped portion of the door window frame facing inside the guide piece and provided with a guide groove being of a U-shape in cross section.

13. A construction of a door in a motor vehicle as set forth in claim 3, wherein the guide member is an extruded metallic member fixed to a stepped portion of the door window frame facing inside the guide piece and provided with a guide groove being of a U-shape in cross section.

14. A construction of a door in a motor vehicle as set forth in claim 4, wherein the guide member is an extruded metallic member fixed to a stepped portion of the door window frame facing inside the guide piece and provided with a guide groove being of a U-shape in cross section.

15. A construction of a door in a motor vehicle as set forth in claim 5, wherein the guide member is an extruded metallic member fixed to a stepped portion of the door window frame facing inside the guide piece and provided with a guide groove being of a U-shape in cross section.

16. A construction of a door in a motor vehicle as set forth in claim 6, wherein the guide member is an extruded metallic member fixed to a stepped portion of the door window frame facing inside the guide piece and provided with a guide groove being of a U-shape in cross section.

17. A construction of a door in a motor vehicle as set forth in claim 7, wherein the guide member is an extruded metallic member fixed to a stepped portion of the door window frame facing inside the guide piece and provided with a guide groove being of a U-shape in cross section.

18. A construction of a door in a motor vehicle as set forth in claim 8, wherein the guide member is an extruded metallic member fixed to a stepped portion of the door window frame facing inside the guide piece and provided with a guide groove being of a U-shape in cross section.

19. A construction of a door in a motor vehicle as set forth in claim 9, wherein the guide member is an extruded metallic member fixed to a stepped portion of the door window frame facing inside the guide piece and provided with a guide groove being of a U-shape in cross section.

20. A construction of a door in a motor vehicle as set forth in claim 10, wherein the guide member is an extruded metallic member fixed to a stepped portion of the door window frame facing inside the guide piece and provided with a guide groove being of a U-shape in cross section.

* * * * *